Figure 1:
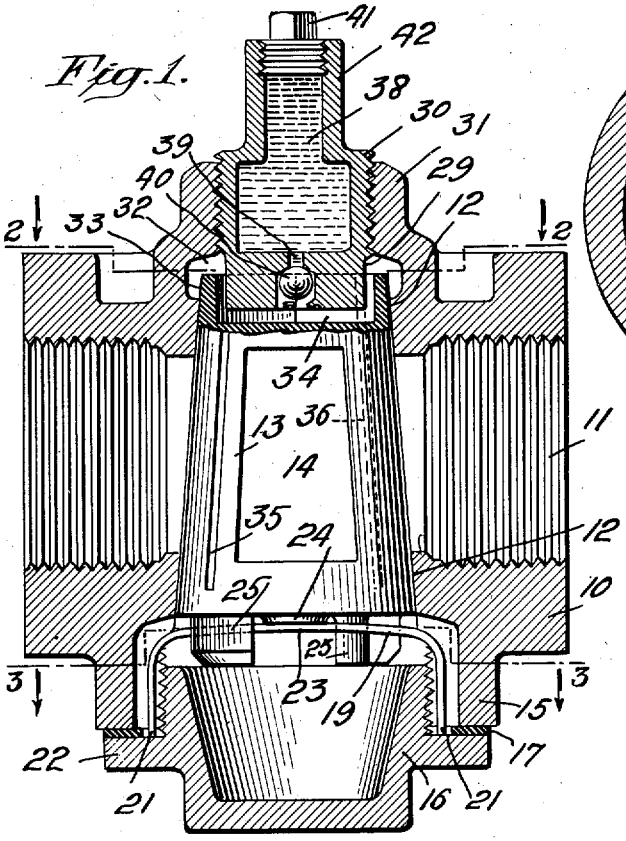

Sept. 16 1930. S. J. NORDSTROM Re. 17,808

VALVE

Original Filed April 14, 1926 2 Sheets-Sheet 1

INVENTOR
Sven Johan Nordstrom
BY
Archibald Cox
ATTORNEY

Sept. 16, 1930. S. J. NORDSTROM Re. 17,808

VALVE

Original Filed April 14, 1926 2 Sheets-Sheet 2

INVENTOR
Sven Johan Nordstrom
BY
Archibald Cox
ATTORNEY

Reissued Sept. 16, 1930

Re. 17,808

UNITED STATES PATENT OFFICE

SVEN JOHAN NORDSTROM, OF OAKLAND, CALIFORNIA, ASSIGNOR TO MERCO NORDSTROM VALVE COMPANY, OF SAN FRANCISCO, CALIFORNIA, A CORPORATION OF DELAWARE

VALVE

Original No. 1,668,168, dated May 1, 1928, Serial No. 101,864, filed April 14, 1926. Application for reissue filed September 6, 1929. Serial No. 390,729.

The invention relates to an improvement in valves and more particularly to an improvement in pressure lubricated valves especially adapted for gas curb cock service.

A gas curb cock is usually a plug valve located under the sidewalk or street in the pipe line leading from the main into the house or other building in which the gas is used. These valves are usually at such a depth below the surface that they must be operated by an extension wrench or handle. They commonly remain open for long periods of time, and since they are more or less exposed to the elements, and are often covered with water and earth, great difficulty is sometimes experienced in closing them in cases of necessity. Great damage has occurred in burning buildings from escaping gas because the curb cock in the sidewalk or street could not be closed. Since every gas consuming house or building is provided with one or more gas curb cocks, and hence great numbers of these valves are produced, the requirement is that they be of simple construction so that they may be manufactured as cheaply as possible.

One object of the present invention is to produce a pressure lubricated plug valve which can be constructed so cheaply that it will be suitable for gas curb cock service. Since the valve is of the type in which lubricant under pressure is used for lifting the plug from its seat so that the bearing or seating surfaces of the valve may be effectively lubricated, the valve will at all times be in condition for ready operation, either from open to closed position or from closed to open position.

Another object of the invention is to so construct and arrange the parts of the valve that the operation of the valve will not be affected by a covering of water or earth.

Still another object of the invention is to arrange the lubricating system of the valve in such a way that when the plug is turned to open position the bearing or seating surfaces are simultaneously lubricated. A feature of the invention in this connection is the provision of means which has the effect of forcing or pulling the plug against its seat when it is turned from open to closed position and of forcing the plug from its seat when it is turned from closed to open position. These objects and other objects of the invention, which will appear as the description proceeds, are accomplished in the improved valve hereinafter described and particularly pointed out in the appended claims.

Figure 3:
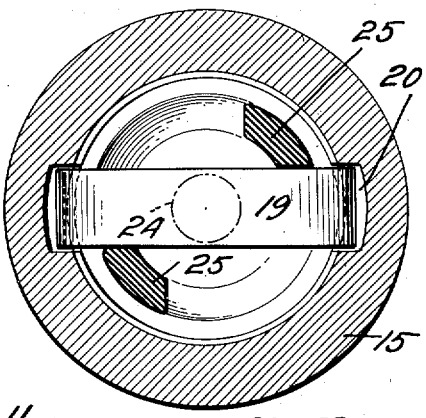
Figure 4:
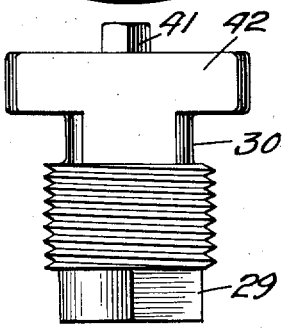
Figure 5:
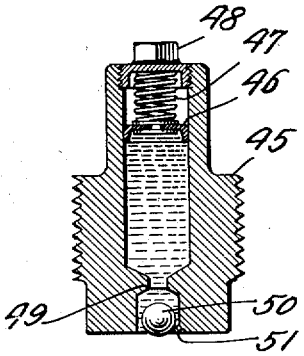
Figure 2:
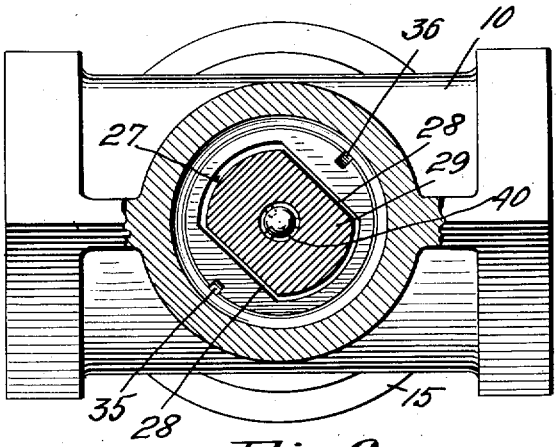
Figure 6:
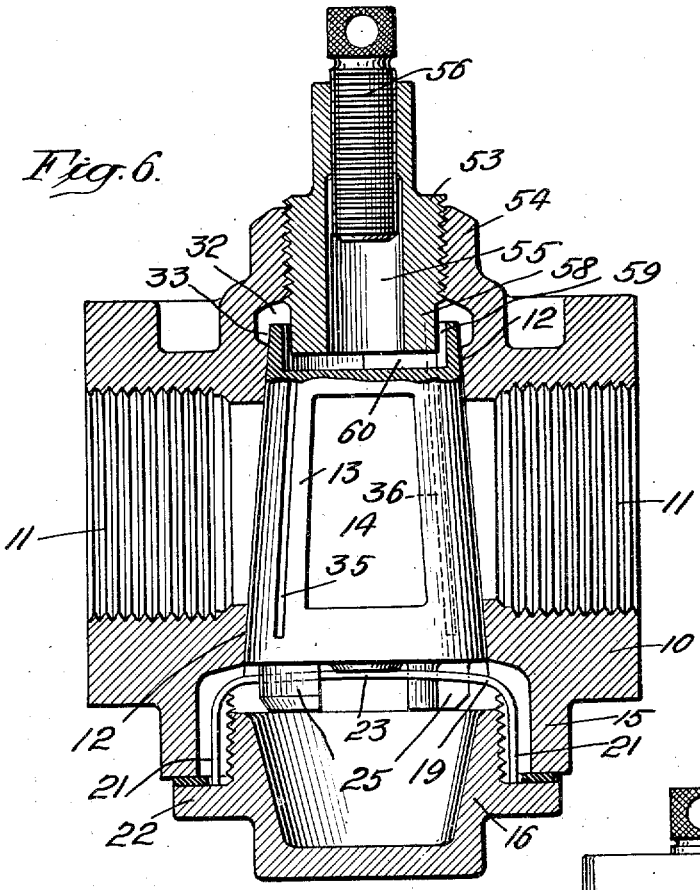
Figure 7:
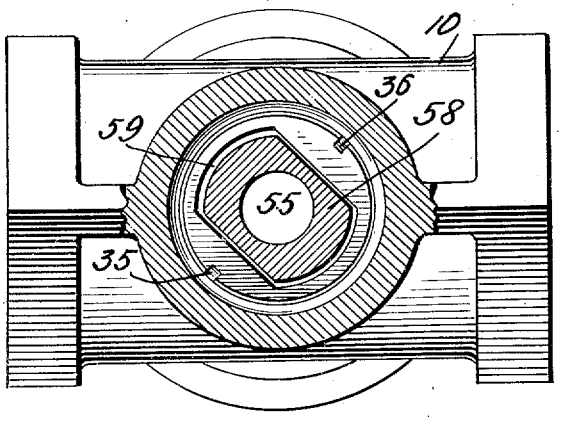
Figure 8:
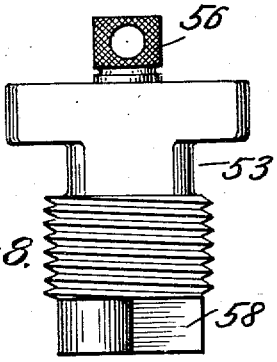
Figure 9:
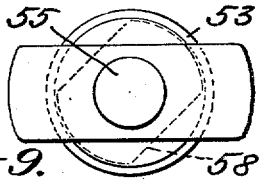

In the accompanying drawings illustrating the preferred form of the invention, Fig. 1 is a longitudinal section through the improved valve; Fig. 2 is a top plan of the valve parts shown in Fig. 1, with the middle portion in section taken on the line 2—2 of Fig. 1; Fig. 3 is a section taken on the line 3—3 of Fig. 1; Fig. 4 is a side elevation of the plug operating and lubricating head shown detached from the valve; Fig. 5 is a longitudinal section through a modified form of plug lubricating and operating head; Fig. 6 is a longitudinal section, similar to Fig. 1, of a modified form of valve; Fig. 7 is a top plan and sectional view, similar to Fig. 2, of the form of valve shown in Fig. 6; Fig. 8 is an elevational detail of the plug operating and lubricating head of the valve shown in Fig. 6; and Fig. 9 is a top plan of the parts shown in Fig. 8.

The improved valve, as illustrated in Fig. 1, comprises a body portion or casing 10, provided with a longitudinal passageway 11 therethrough and a tapered valve seat 12 formed transversely of the passageway 11. Seated in the valve seat 12 is a tapered plug 13 provided with a hole 14 adapted to register with the passageway 11 when the valve is open. The plug as shown in Fig. 1 is in closed position sealing the passageway 11 through the casing.

The side of the casing 10 at which the larger end of the tapered valve seat 12 is formed is provided with an annular internally threaded flange 15 and the opening therethrough is closed by a cap or cover 16, the joint between the two parts being made tight by means of a gasket 17. A flat U-shaped spring 19 is interposed between the larger end of the plug and the cap so as to resiliently hold the plug against its seat. The spring 19 is received in a slot 20 cut longitudinally in the flange portion 15 of the casing and when the spring is in operative position the two ends 21 thereof bear against the inside of the circular flange part 22 of the cap 16 and the middle portion 23 of the spring bears against a boss 24 projecting from the center of the larger end of the plug 13. In order that the plug may have only a 90° turn the larger end of the plug is provided with two projections 25 arranged on opposite sides of the spring 19 which serves as a stop for the projections 25 to prevent further turning of the plug when it has been turned in one direction to open position and in the opposite direction to closed position.

The smaller end of the tapered plug 13 is truncated and is provided with a transverse recess 27 having flattened sides 28. The plug is turned by means of the teat or projection 29 which in cross-section has the same shape as the recess 27 and fits loosely therein, as shown in Fig. 2. The projection 28 extends inwardly from a hollow, plug operating and lubricating head 30 which is threaded into the bonnet-like flange 31 extending outwardly from the side of the casing surrounding the smaller end of the plug. The bottom of the projection 29 is separated from the bottom of the recess 27 by a space 34. The inner end of the circular flange 31 forms with the body portion of the casing an annular recess or chamber 32 into which the smaller end 33 of the plug extends. Two longitudinally disposed lubricating grooves or channels 35 and 36 are formed in the seating surface of the plug and extend from the extremity of the smaller end of the plug to almost the extremity of the larger end of the plug. The annular recess 32 constitutes a lubricant chamber and when lubricant in this chamber, in the lubricating grooves and in the space 34 is put under pressure, the plug is separated slightly from its seat 12 against the action of the spring 19 so that lubricant will escape laterally from the grooves or channels 35 and 36, and when the plug is turned this lubricant will be smeared over the seating or bearing surfaces of the plug and its seat and thereby effectively lubricate them. The lubricant enters the space 34 and the chamber 32 from the reservoir 38 formed in the head 30. The outlet 39 between the reservoir 38 and the space 34 is provided with a ball check valve 40. The contracted inlet of the reservoir 38 is closed by the plug 41. The outer end of the head 30 is flattened and elongated at 42 to accommodate the wrench or handle by which the head 30 is turned to rotate the plug to open and closed positions.

In operating a plug valve the universal practice is to turn the plug in a counter-clockwise direction to open the valve and in a clockwise direction to close the valve. By making the pitch of the cooperating threads on the head 30 and the flange 31 left hand, so that the head 30 will travel inward toward the plug 13 when the head is turned to open the valve, two objects are accomplished: (1) The lubricant in the space 34, in the chamber 32 and in the lubricating grooves is put under pressure to lift the plug from its seat and squeeze the lubricant out of the grooves so that as the plug is turned it smears over the slightly separated bearing surfaces; and (2) the sliding frictional engagement between the flattened sides of the projection 29 and the flattened sides 28 of the recess 27 acts in conjunction with the lubricant under pressure to force the plug from its seat. When the head 30 is turned in the reverse direction to rotate the plug to closed position, the frictional sliding engagement between the flattened sides of the projection 29 and the flattened sides 28 of the recess 27 acts to pull the plug against its seat. This action combined with the action of the spring 19 assures a tight joint between the plug and its seat when the valve is closed.

In assembling the valve for operation the plug operating and lubricating head is first screwed into the threaded flange 31, and when it has been turned down into the desired position the flattened sides of the projection 29 are so located as to hold the plug in its closed position when the latter is inserted into the valve seat. The distance inward into the valve casing to which the head 30 is turned in assembling the valve will be such that a sufficient lubricant containing space 34 will be left between the bottom of the projection 29 and the bottom of the recess 27, as shown in Fig. 1. The U-shaped spring 19 is then put in place and the cover 16 is screwed down into the threaded flange 15 with the gasket 17 interposed between the flange 22 and the casing. The hollow head 30 is next filled with lubricant. When the valve is first assembled it is desirable that a pressure lubricant gun be applied to the threaded inlet of the head 30 and all the lubricant passages in the valve, including the chamber 32 and the lubricating grooves 35 and 36, be filled with lubricant. When the pressure gun is removed, the plug 41 is used to close the inlet.

The valve is now in the condition shown in Fig. 1 and is ready for operation. The workman places a wrench or handle on the flattened part 42 of the head 30 and turns it in a counter-clockwise direction to move the plug 13 to open position with the hole 14 in registry with the passageway 11. Inasmuch as all the lubricant containing spaces in the valve were filled at the time the valve was assembled, the axial travel of the inner end 29 of the head 30 relatively to the plug 13 causes the lubricant in the space 34, in the chamber 32 and in the grooves 35 and 36 to be put under pressure sufficient to separate the plug 13 slightly from the valve seat, thereby permitting the lubricant in the grooves 35 and 36 to ooze out laterally and be smeared over the bearing or seating surfaces of the plug and its seat as the plug is rotated. When the lubricant in the space 34 is put under pressure at the beginning of the turning movement of the head 30, the ball 40 is forced into its seat, thereby closing the outlet 39 of the head 30 and sealing this way of egress from the space 34. The cooperating threads on the head 30 and the circular flange 31 are sufficiently tight to prevent egress of lubricant, especially after the lubricant has once entered the slight spaces between the threads. In this connection it will be observed that this arrangement is an efficient means of keeping the threads lubricated and easy working as well as fluid tight. Hence a covering of water or earth will not interfere with the operation of the valve.

When the head 30 is turned in a clockwise direction to move the plug 13 to its closed position, the frictional engagement between the sides of the projection 29 and the flattened sides 28 of the recess 27 as the head 30 moves outward axially from the plug 13 acts, in conjunction with the spring 19, to draw the plug 13 tightly against its seat. As the head 30 moves outwardly relatively to the smaller end of the plug 13, a vacuum is created in the space 34 which results in the unseating of the ball valve 40 and permits the passage of lubricant from the reservoir 38 into the space 34. Thus when the head 30 is again turned in a counter-clockwise direction, the space 34 being filled with lubricant, the travel of the end of the projection 29 toward the bottom of the recess 27 will put the lubricant under pressure, closing the valve 40 as before and resulting in a slight separation of the plug from the valve seat.

In Fig. 5 is shown in longitudinal section a modified form of plug operating and lubricating head designated by the reference numeral 45. This head 45 has the same mode of operation as the head 30 and may be substituted for it. It differs in construction from the head 30 in that it is provided with a plunger or piston 46 and a coiled expansion spring 47 interposed between the plunger 46 and the plug 48 which closes the outer end of the head. The head 45 may be substituted for the head 30 in those cases where a more viscous lubricant is employed. The outlet port 49 of the head 45 is adapted to be closed by the ball valve 50 when the head 45 is turned in a counter-clockwise direction to move the plug 13 to open position. When the head 45 is turned in the reverse direction the ball 50 drops onto the holding prongs 51 to permit the lubricant to be forced into the space 34 by means of the spring-pressed plunger 46.

The modified form of valve shown in Fig. 6 is of the same construction, except as to the head 53, as the valve shown in Fig. 1, and consequently the corresponding valve parts unconnected with the heads are designated by the same reference numerals. The head 53 is provided with a left hand thread which travels in a correspondingly pitched thread in the circular flange 54 of the valve casing. The head 53 is bored axially throughout its length to provide a lubricant reservoir 55 and the outer end of the head is closed by the pressure screw 56. The inner end or projection 58 of the head 53 has the same shape as the projection 29 of the head 30 and extends into a recess 59 which corresponds to the recess 27. A space 60 separates the inner end of the projection 58 from the bottom of the recess 59. When the head 53 is turned in a counter-clockwise direction to rotate the plug to open position, the inward travel of the projection 58 into the recess 59 compresses the lubricant therein, in the chamber 32 and in the lubricating grooves 35 and 36, with the result that the plug is separated slightly from its seat to permit the lubricant to be smeared over the seating surfaces as the plug rotates. When the head 53 is turned in the reverse direction and the projection 58 moves outwardly from the bottom of the recess 59, a space is left. This space is filled with lubricant by turning down on the pressure screw 56 before the plug is again turned to open position. In all other respects the plug operating and lubricating head 53 performs the same functions and has the same mode of operation as the heads 30 and 45.

Having thus described the invention, what I claim as new is:—

1. A valve comprising, a casing having a passageway therethrough and a tapered valve seat formed transversely of the passageway, a tapered plug seated in the valve seat and having a hole adapted to register with the passageway, resilient means associated with the larger end of the plug for holding the plug against its seat, and a hollow lubricant containing head screwed into the casing beyond the smaller end of the plug, the smaller end of the plug and the inner end of the head being provided with cooperating means whereby when the head is turned the plug is rotated in its seat, and a space between the head and the plug for containing lubricant.

2. A valve comprising, a casing having a passageway therethrough and a tapered valve seat formed transversely of the passageway, a tapered plug seated in the valve seat and having a hole adapted to register with the passageway, the ends of the plug terminating within the casing, a cover for the casing at the larger end of the plug, resilient means between the cover and the larger end of the plug for holding the plug against its seat, a circular flange provided with an internal thread of left hand pitch at the side of the casing surrounding the smaller end of the plug, a hollow lubricant containing head threaded into the circular flange, the smaller end of the plug being provided with a transverse recess into which the inner end of the head extends, an annular chamber formed in the casing at the smaller end of the plug, and longitudinal lubricating grooves in the seating surface of the plug and extending into the annular chamber.

3. A valve comprising, a casing having a passageway therethrough and a tapered valve seat formed transversely of the passageway, a tapered plug seated in the valve seat and having a hole adapted to register with the passageway, resilient means associated with the larger end of the plug for holding the plug against its seat, the smaller end of the plug being provided with a transverse recess, a hollow head threaded into the casing at the smaller end of the plug and having its inner end extending into the recess in the smaller end of the plug, the bottom of the recess and the inner end of the head being separated by a space, means for holding lubricant in the head, a communication between the lubricant containing part of the head and the space between the head and the plug whereby when the head and plug are turned in one direction lubricant passes into the space, and when the head and plug are turned in the reverse direction the axial travel of the head relative to the plug compresses the lubricant in the space and thereby acts to lift the plug from its seat.

4. A valve comprising, a casing having a passageway therethrough and a tapered valve seat formed transversely of the passageway, a tapered plug seated in the valve seat and having a hole adapted to register with the passageway, resilient means associated with the larger end of the plug for holding the plug against its seat, a transverse recess formed in the smaller end of the plug, a chamber formed in the casing and into which the smaller end of the plug extends, longitudinal lubricating channels in the seating surface of the plug extending from the chamber and terminating short of the larger end of the plug, and a hollow head adapted to contain lubricant screwed into a left hand thread in the casing and having its inner end extending into the transverse recess in the smaller end of the plug, said head having wrench engaging surfaces whereby the head may be turned to rotate the plug in its seat.

5. A valve comprising, a casing having a passageway therethrough and a tapered valve seat formed transversely of the passageway, a tapered plug seated in the valve seat and having a hole adapted to register with the passageway, a cover for the casing at the larger end of the plug, a spring between the cover and the larger end of the plug for resiliently holding the plug against its seat, the smaller end of the plug terminating within the casing, a circular flange provided with a left hand thread in the side of the casing at the smaller end of the plug, a head threaded into the circular flange, the inner end of the head and the smaller end of the plug having cooperating means providing a loose connection between them whereby when the head is turned the plug is rotated in its seat, and lubricating channels in the seating surface of the plug, the head being provided with means for introducing lubricant into the space between the inner end of the head and the smaller end of the plug.

6. A valve comprising, a casing having a passageway therethrough and a tapered valve seat formed transversely of the passageway, a tapered plug seated in the valve seat and having a hole adapted to register with the passageway, means for resiliently holding the plug against its seat, and a head having a driving connection with the plug threaded in the casing at the smaller end of the plug and having means for introducing fluid between the head and the plug so that when the head is turned in one direction and travels axially relatively to the plug the compression of the fluid between the head and the plug causes the plug to be lifted from its seat.

7. A valve comprising, a casing having a passageway therethrough and a valve seat formed transversely of the passageway, a plug seated in the valve seat and having a hole adapted to register with the passageway, a spring held in the casing for resiliently holding the plug against its seat and projections on the plug arranged to be engaged by the spring to determine the open and closed positions of the plug.

8. A valve comprising, a casing having a passageway therethrough and a tapered valve seat formed transversely of the passageway, a tapered plug seated in the valve seat and having a hole adapted to register with the passageway, a spring held in a recess in the casing for resiliently holding the plug against its seat, projections on the plug straddling the spring, said projections being so located relatively to the hole in the plug that engagement with the spring determines the open and closed positions of the plug, and the size of the projections relatively to the width of the spring permits the plug to turn through an angle of approximately 90°.

9. A valve comprising, a casing having a passageway therethrough and a tapered valve seat formed transversely of the passageway, a tapered plug seated in the valve seat and having a hole adapted to register with the passageway, the surface of the plug being provided with longitudinal lubricating grooves, two projections extending from the larger end of the plug and located on opposite sides thereof, an inverted U-shaped spring located in a recess in the side of the casing surrounding the larger end of the plug, the middle section of the spring being placed between the projections, and a cover in engagement with the ends of the spring for forcing the middle part of the spring against the larger end of the plug to hold the plug in its seat, the relation of the position of the lubricating grooves and the projections and the relation of the size of the projections and the size of the spring being such that the engagement of the projections with the spring permits the plug to be turned through an arc of only about 90° so that the grooves will not be exposed to the passageway.

10. In a valve, a casing having a passageway therethrough and a bore or valve seat formed transversely of the passageway, a plug rotatably positioned in the bore and arranged to move axially therein, the ends of the plug terminating within the casing and the casing being closed at each side at the ends of the plug to seal the plug from the atmosphere so that no part of the plug is exposed to the atmosphere, means for introducing lubricant under pressure into the valve to act on the plug to move it axially in one direction, and means for urging the plug axially in the other direction.

11. In a valve, a casing having a passageway therethrough and a tapered bore or valve seat formed transversely of the passageway, a tapered plug rotatably positioned in the bore and arranged to move axially thereof, the plug terminating within the casing and the casing being closed at both ends of the plug to seal the plug from the atmosphere so that no part of the plug is exposed to the atmosphere, means for introducing lubricant under pressure into the valve to act on the plug to move it in the direction to separate the plug from the bore, and resilient means for urging the plug in the direction to seat it against the bore.

12. A valve comprising, a casing having a passageway therethrough and a tapered bore or seat formed transversely of the passageway, a tapered plug rotatably positioned in the bore, resilient means acting on the plug in a direction to seat the plug against the bore, a head threaded into the casing at the smaller end of the plug, the smaller end of the plug and the inner end of the head having a driving connection at certain points and being spaced apart at other points to provide a space to contain lubricant, turning of the head inwardly serving to compress the lubricant whereby the plug is moved axially against the action of the resilient means.

13. A valve comprising, a casing having a passageway therethrough and a bore or valve seat formed transversely of the passageway, a plug rotatably positioned in the bore and having a hole adapted to register with the passageway, a head rotatably mounted in the casing and having a driving connection with the plug, the head and casing having cooperating means for advancing the head into the casing upon rotation of the same in one direction, there being a space between the head and the plug forming a chamber adapted to contain lubricant, and channels communicating with the chamber for conducting lubricant to the peripheral surfaces of the plug and the bore, turning of the head in said one direction serving to compress the lubricant in the chamber and force it into the channels.

14. In a valve having a casing with a passageway therethrough and a plug rotatably positioned in the casing for controlling the passageway, a hollow head threaded into the casing and having a driving connection with the plug, said head being adapted to contain lubricant, the inner end of the head being provided with a hole for conducting lubricant from the head into the casing, and a check-valve located in the hole for controlling the passage of lubricant therethrough.

15. In a valve having a casing with a passageway therethrough and a plug rotatably positioned in the casing for controlling the passageway, a hollow lubricant-containing head threaded into the casing and having a driving connection with one end of the plug, there being a space between the inner end of the head and the plug adapted to receive lubricant, the inner end of the head having a hole for conducting lubricant into the space between the head and the plug, turning of the head in one direction increasing the space between the head and the plug, and turning of the head in the other direction decreasing the space between the head and the plug, and a check-valve located in the hole and arranged to be unseated when the head is turned in the first direction to permit lubricant to pass into the space between the head and the plug and to be seated when the head is turned in the opposite direction.

16. In a valve having a casing with a passageway therethrough and a plug rotatably positioned in the casing for controlling the passageway, a hollow lubricant-containing head rotatably mounted in the casing and having a driving connection with one end of the plug, the head and casing having cooperating means for advancing the head into the casing upon rotation of the same in one direction and for retracting the head from the casing upon rotation of the head in the opposite direction, there being a space between the inner end of the head and the plug adapted to receive lubricant, the inner end of the head having a hole for conducting lubricant into the space between the head and the plug, and a check-valve located in the hole and arranged to be unseated when the head is turned in the first direction to permit lubricant to pass into the space between the head and the plug and to be seated when the head is turned in the opposite direction.

17. A valve comprising, a casing having a passageway therethrough and a bore or valve seat formed transversely of the passageway, a plug rotatably positioned within the bore and having a hole adapted to register with the passageway, a head separate from the plug rotatably mounted in the casing and having a driving connection with the plug, a lubricant chamber in communication with the coacting surfaces of the valve, the head and casing having cooperating means whereby when the head is turned in either direction it moves axially relatively to the plug and changes the volumetric capacity of the lubricant chamber.

18. In a valve, a casing having a passageway therethrough and a bore formed transversely of the passageway, a plug rotatably positioned in the bore and arranged to move axially therein, the ends of the plug terminating within the casing and the casing being closed at each end of the plug so that no part of the plug is exposed to the atmosphere, the casing having a lubricant containing chamber to which one end of the plug is exposed, means for putting the lubricant under pressure to move the plug axially in one direction, and means for urging the plug axially in the opposite direction.

19. In a valve, a casing having a passageway therethrough and a bore formed transversely of the passageway, a plug rotatably positioned in the bore and arranged to move axially therein, a plug-turning head rotatably mounted in the casing at one end of the plug, the inner end of the head and the adjacent end of the plug being spaced apart but having a driving connection between them permitting the plug to move axially, the casing being provided with a chamber of which the space between the head and the plug is a part for containing lubricant which is adapted to be placed under pressure to move the plug axially in the direction away from the head, and means for resiliently urging the plug in the direction toward the head.

SVEN JOHAN NORDSTROM.